No. 895,561. PATENTED AUG. 11, 1908.
J. B. HEMBREE.
VEHICLE WHEEL.
APPLICATION FILED MAY 21, 1907.
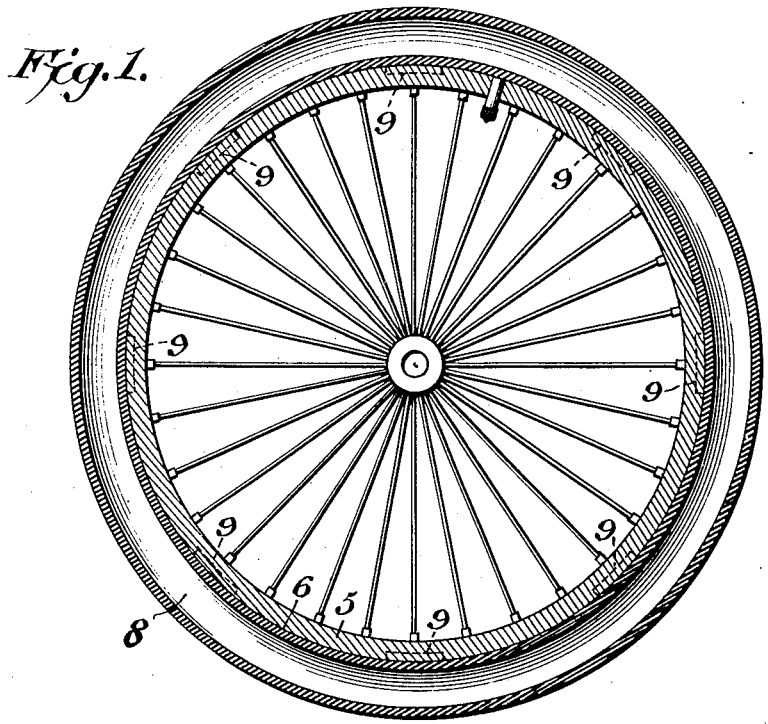
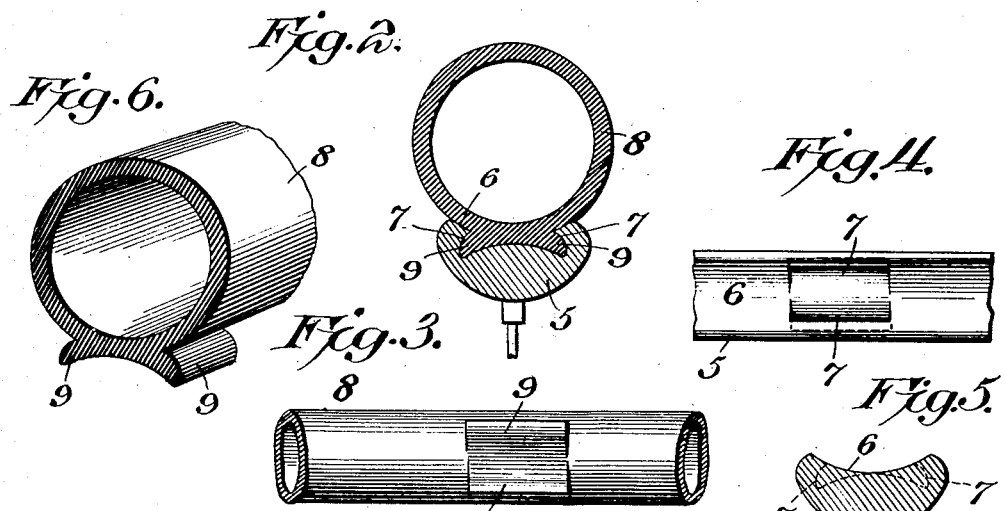
J. Benton Hembree, Inventor,

UNITED STATES PATENT OFFICE.

JOHN BENTON HEMBREE, OF PIEDMONT, SOUTH CAROLINA.

VEHICLE-WHEEL.

No. 895,561.　　　　Specification of Letters Patent.　　　Patented Aug. 11, 1908.

Application filed May 21, 1907. Serial No. 374,816.

*To all whom it may concern:*

Be it known that I, JOHN BENTON HEM-BREE, a citizen of the United States, residing at Piedmont, in the county of Greenville and State of South Carolina, have invented a new and useful Vehicle-Wheel, of which the following is a specification.

The present invention relates to pneumatic tired wheels, and the primary object is to provide novel, simple and effective means for securing a pneumatic tire to a wheel without the necessity of employing cement or other adhesive material, such means furthermore positively preventing creeping or longitudinal movement of the tire and thereby obviating the danger of cutting the valve stem.

The preferred embodiment of the invention is illustrated in the accompanying drawings, wherein:—

Figure 1 is a sectional view through a wheel, showing the tire secured thereon by the improved means. Fig. 2 is a detail cross sectional view through the rim and tire. Fig. 3 is a bottom plan view of a portion of the tire. Fig. 4 is a top plan view of a portion of the rim. Fig. 5 is a cross section of the rim at one side of the sockets. Fig. 6 is a detail perspective view of a portion of the tire.

Similar reference numerals designate corresponding parts in all the figures of the drawings.

The wheel may be of any well known or desired construction, and includes a solid felly or rim 5 having an annular transversely concaved channel 6 in its outer side. The outer face of the rim or felly is further provided at suitable intervals with opposite spaced undercut sockets 7 that open into the channel and have substantially flat end walls, forming stop shoulders. The bottom walls of the sockets are made convex and form with the connecting wall of the rim a continuous outward curve from one socket to the other. This is clearly shown in Fig. 2. A pneumatic tire 8 of any well known form, continuous and circular in cross section, has its inner side engaged in the channel 6 in the ordinary manner, but instead of being secured by cement, the inner side of said tire is provided at intervals with opposite spaced integral lips or tongues 9, these tongues being engaged in the sockets of the rim or felly, being provided with flat ends that abut against the stop shoulders. Said tongues are inclined outwardly at an angle, and being tapered and flexible are caused to spring within and fill the sockets and engage the undercut walls thereof. The bottom of the tire between the tongues and the lower sides of said tongues are concaved to fit the said convex walls of the sockets and intermediate portion of the rim. The preferable arrangement is to place the tongues directly opposite each other, but this is susceptible of variation.

Referring to Fig. 4 it will be noted that the rim, except the place where the sockets are located, is concave. It will thus be observed, particularly by reference to Fig. 2, that the tongues or lips are interlocked with the wheel rim. They may be readily introduced while the tire is deflated, but when said tire is inflated, they are practically irremovable. Thus the tire is effectively secured to the rim, but more than this, inasmuch as these lips or tongues are separate and disposed in separate sockets, it will be evident that the tire cannot creep or move longitudinally around the rim. Thus the danger of cutting the valve stem is entirely eliminated.

From the foregoing, it is thought that the construction, operation, and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

The combination with a solid rim or felly having an annular transversely concaved channel in its periphery and sets of opposite spaced undercut elongated sockets opening into the opposite sides of the channel and disposed at intervals about the rim or felly longitudinally thereof, said sockets tapering toward their inner ends to substantially sharp corners and having flat end walls forming stop shoulders, of a pneumatic tire that is seated in the annular channel, said tire comprising a single integral yielding wall that is substantially circular in cross section and has oppositely outstanding integral spaced elongated lips or tongues of yielding material located at intervals around the inner side thereof on opposite sides of the center of its inner wall and engaged in the sockets of the rim or felly, the lips or tongues being outwardly tapered to substantial edges and filling the sockets, said lips or tongues having flat ends disposed at substantially right angles to the tire wall and abutting against the flat end walls or shoulders of the sockets, said tire being thereby interlocked with the rim or felly and being held by said abutting end walls or shoulders against longitudinal movement or creeping thereon, the lips or tongues slipping freely into and out of the sockets when the tire is deflated.

In testimony, that I claim the foregoing as my own, I have hereto affixed my signature in the presence of two witnesses.

JOHN BENTON HEMBREE.

Witnesses:
A. C. DUNCAN,
ED MCCALL.